(12) United States Patent
Yang et al.

(10) Patent No.: US 9,571,621 B2
(45) Date of Patent: Feb. 14, 2017

(54) DYNAMIC UNLOCKING METHOD AND ELECTRONIC APPARATUS USING THE SAME

(71) Applicant: Wistron Corporation, New Taipei (TW)

(72) Inventors: Yu-Gang Yang, New Taipei (TW); Yun-Tian Bai, New Taipei (TW)

(73) Assignee: Wistron Corporation, New Taipei (TW)

( * ) Notice: Subject to any disclaimer, the term of this patent is extended or adjusted under 35 U.S.C. 154(b) by 216 days.

(21) Appl. No.: 14/571,289

(22) Filed: Dec. 16, 2014

(65) Prior Publication Data

US 2016/0065713 A1 Mar. 3, 2016

(30) Foreign Application Priority Data

Aug. 29, 2014 (CN) .......................... 2014 1 0436916

(51) Int. Cl.
*H04M 1/673* (2006.01)
*G06F 21/36* (2013.01)
(Continued)

(52) U.S. Cl.
CPC ............ *H04M 1/673* (2013.01); *G06F 3/0488* (2013.01); *G06F 21/36* (2013.01); *H04W 12/08* (2013.01)

(58) Field of Classification Search
CPC .... G06F 3/0488; G06F 3/04883; G06F 21/36; G06F 3/04817; G06F 21/31; G06F 3/017; H04M 1/67; H04M 2250/22; H04M 1/72519; H04M 1/673; H04M 1/72583; H04M 1/72586; H04W 12/06; H04W 12/08; H04W 88/02; G06Q 20/206
See application file for complete search history.

(56) References Cited

U.S. PATENT DOCUMENTS 7,395,506 B2 *  7/2008  Tan ..................... G06F 3/04886
                                                    705/18
7,593,000 B1 *  9/2009  Chin ...................... G06F 21/32
                                                    345/156
(Continued)

FOREIGN PATENT DOCUMENTS

CN   102566927   7/2012
CN   103543939   1/2014
TW   201324316   6/2013

OTHER PUBLICATIONS

Office Action of Taiwan Counterpart Application with partial English translation, issued on Dec. 22, 2015, p. 1-15, in which the listed reference was cited.

*Primary Examiner* — Matthew Sams
(74) *Attorney, Agent, or Firm* — Jianq Chyun IP Office

(57) ABSTRACT

A dynamic unlocking method and an electronic apparatus using the same method are proposed. The method includes the following steps: recording an unlocking password combination including at least one unlocking password, where each unlocking password is characterized by a touch operation initiating from a specific icon and sliding toward a specific direction along a specific path by a specific distance; displaying an unlocking screen including a plurality of predetermined icons, where the predetermined icons are randomly arranged on the specific path; receiving at least one unlocking input performed on the predetermined icons; when the at least one received unlocking input completely matches the unlocking password combination, unlocking the electronic apparatus.

22 Claims, 3 Drawing Sheets

(51) Int. Cl.
*G06F 3/0488* (2013.01)
*H04W 12/08* (2009.01)

(56) References Cited

U.S. PATENT DOCUMENTS

| | | | | |
|---|---|---|---|---|
| 8,504,842 B1* | 8/2013 | Meacham | | G06F 3/0488 713/182 |
| 8,707,175 B2* | 4/2014 | Lee | | G06F 3/04817 715/702 |
| 8,924,894 B1* | 12/2014 | Yaksick | | G06F 3/04883 715/863 |
| 9,052,753 B2* | 6/2015 | Hong | | G06F 3/0488 |
| 9,110,589 B1* | 8/2015 | Yaksick | | G06F 3/04883 |
| 9,137,669 B2* | 9/2015 | Kim | | G06F 1/1694 |
| 2006/0053301 A1* | 3/2006 | Shin | | G06F 21/36 713/183 |
| 2007/0150826 A1* | 6/2007 | Anzures | | G06F 3/017 715/772 |
| 2009/0122018 A1* | 5/2009 | Vymenets | | G06F 3/04817 345/173 |
| 2010/0257490 A1* | 10/2010 | Lyon | | G06F 3/0488 715/863 |
| 2010/0269040 A1* | 10/2010 | Lee | | G06F 3/04817 715/702 |
| 2011/0271181 A1* | 11/2011 | Tsai | | G06F 3/04883 715/702 |
| 2012/0046079 A1* | 2/2012 | Kim | | H04M 1/72577 455/566 |
| 2013/0055169 A1* | 2/2013 | Wright | | H04M 1/67 715/863 |
| 2013/0057496 A1* | 3/2013 | Hong | | G06F 3/0488 345/173 |
| 2013/0174094 A1* | 7/2013 | Heo | | G06F 3/04883 715/835 |
| 2013/0174247 A1* | 7/2013 | Stedman | | G06F 21/36 726/16 |
| 2013/0187753 A1* | 7/2013 | Chiriyankandath | | G06F 3/0488 340/5.51 |
| 2013/0212532 A1* | 8/2013 | Hsieh | | G06F 3/04883 715/833 |
| 2013/0283199 A1* | 10/2013 | Selig | | G06F 3/0484 715/781 |
| 2013/0298024 A1* | 11/2013 | Rhee | | G06F 21/31 715/716 |
| 2014/0137045 A1* | 5/2014 | Ding | | G06F 3/04886 715/835 |
| 2014/0187204 A1* | 7/2014 | Hartmann | | G06F 21/316 455/411 |
| 2014/0289843 A1* | 9/2014 | Chiang | | G06F 3/04883 726/19 |
| 2014/0335826 A1* | 11/2014 | Yu | | H04W 12/08 455/411 |
| 2015/0047014 A1* | 2/2015 | Yoon | | G06F 21/36 726/16 |

\* cited by examiner

DYNAMIC UNLOCKING METHOD AND ELECTRONIC APPARATUS USING THE SAME

CROSS-REFERENCE TO RELATED APPLICATION

This application claims the priority benefit of China application serial no. 201410436916.1, filed on Aug. 29, 2014. The entirety of the above-mentioned patent application is hereby incorporated by reference herein and made a part of this specification.

BACKGROUND

Technical Field

The invention relates to an unlocking method and an electronic apparatus, and particularly relates to a dynamic unlocking method and an electronic apparatus using the same.

Related Art

In modern society, smart electronic apparatus such as smart phones, personal digital assistants (PDAs), tablet personal computers (PCs), etc. have become indispensable tools in people's daily life. In order to prevent other people other than a user of the electronic apparatus from arbitrarily viewing information in the electronic apparatus and avoid inadvertently touching, the electronic apparatus is generally configured with a locking mechanism for locking a screen or keys thereon. When the user is intended to unlock the electronic apparatus, the user can input an unlocking pattern (for example, a password or a figure, etc.) to unlock the electronic apparatus. Then, the electronic apparatus can compare the unlocking pattern inputted by the user with a predetermined unlocking pattern, and if the two unlocking patterns are matched to each other, the locking mechanism is unlocked. However, during a process of using the mobile phone, it is inevitable to leave using traces such as sweat stain and fingerprint, etc. on the touch screen, and from some of the using traces, an unlocking combination of the user used for unlocking the mobile phone can be clearly identified.

Referring to FIG. 1A and FIG. 1B, which respectively illustrate two commonly used unlocking methods of the smart phone. FIG. 1A is a figure unlocking method widely used on Android equipment. If a relatively clear figure unlocking trace is remained on a device screen of FIG. 1A, a user who doesn't know the unlock figure can unlock the mobile phone through two attempts at most. Moreover, FIG. 1B is a four-digit unlocking method widely used on smart phones. In such method, a user who doesn't know the unlocking digits can unlock the mobile phone through 24 attempts at most in case that an unlocking trace on the touch screen is observed by the user.

Since many users install shopping software and/or bind bank accounts in the mobile phones, when the mobile phone is lost or stolen, the person getting the mobile phone can easily unlock the mobile phone according to the unlocking trace remained on the touch screen. In this case, the non-owners can steal money in the bind bank account, or use contact information in a mail list to conduct fraud, which may cause great economic losses to the original user or their relatives and friends.

Due to safety risks existed in the aforementioned two unlocking methods, a simple, safe and reliable unlocking method is required to be developed, so as to reduce the risk and economic loss caused by loss of the mobile phone.

SUMMARY

Accordingly, the invention is directed to a dynamic unlocking method and an electronic apparatus using the same, by which a suitably designed unlocking password characterization method is used to effectively increase difficulty of unlocking the electronic apparatus, so as to provide a simple, safe and reliable unlocking method.

The invention provides a dynamic unlocking method, which is adapted to an electronic apparatus. The method includes following steps: recording an unlocking password combination including at least one unlocking password, where each of the unlocking passwords is characterized by a touch operation initiating from a specific icon and sliding toward a specific direction along a specific path by a specific distance, and the specific direction includes a first direction or a second direction opposite to the first direction; displaying an unlocking screen including a plurality of predetermined icons, where the predetermined icons are randomly arranged on the specific path; receiving at least one unlocking input performed on the predetermined icons; and unlocking the electronic apparatus when the at least one received unlocking input completely matches the unlocking password combination.

In an embodiment of the invention, the specific distance is characterized by a number of the predetermined icons passed through by the touch operation.

In an embodiment of the invention, the specific path forms a geometric figure, and before the step of displaying the unlocking screen including a plurality of the predetermined icons, the dynamic unlocking method further includes randomly scaling a dimension of the geometric figure.

In an embodiment of the invention, the specific path forms a geometric figure, and before the step of displaying the unlocking screen including a plurality of the predetermined icons, the dynamic unlocking method further includes randomly adjusting a display position of the geometric figure.

In an embodiment of the invention, the geometric figure is a round, the first direction is a clockwise direction, and the second direction is a counterclockwise direction. The specific distance is characterized by a multiple of an arc length between adjacent icons in the predetermined icons.

In an embodiment of the invention, the geometric figure is a straight line, the first direction is a rightward direction, and the second direction is a leftward direction. The specific distance is characterized by a multiple of a distance between adjacent icons in the predetermined icons.

In an embodiment of the invention, each of the predetermined icons includes at least one of a digit, a symbol and a letter.

The invention provides an electronic apparatus including a user interface unit, a storage unit and a processing unit. The storage unit stores a plurality of modules. The processing unit is coupled to the user interface unit and the storage unit, and accesses and executes the modules stored in the storage unit. The modules include a recording module, a display module, a receiving module and an unlocking module. The recording module records an unlocking password combination including at least one unlocking password, where each of the unlocking passwords is characterized by a touch operation initiating from a specific icon and sliding toward a specific direction along a specific path by a specific distance, and the specific direction includes a first direction or a second direction opposite to the first direction. The display module controls the user interface unit to display an unlocking screen including a plurality of predetermined icons, where the predetermined icons are randomly arranged on the specific path. The receiving module receives at least one unlocking input performed on the predetermined icons through the user interface unit. When the at least one received unlocking input completely matches the unlocking password combination, the unlocking module unlocks the electronic apparatus.

According to the above descriptions, after complicating the characterization method of the unlocking password, the dynamic unlocking method provided by the invention effectively increases difficulty for unlocking the electronic apparatus. Moreover, since the predetermined icons on the unlocking screen are randomly arranged each time when the unlocking screen is displayed, a person who doesn't know the unlocking password is unable to easily get the correct unlocking password combination from an unlocking trace remained on the electronic apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 2:
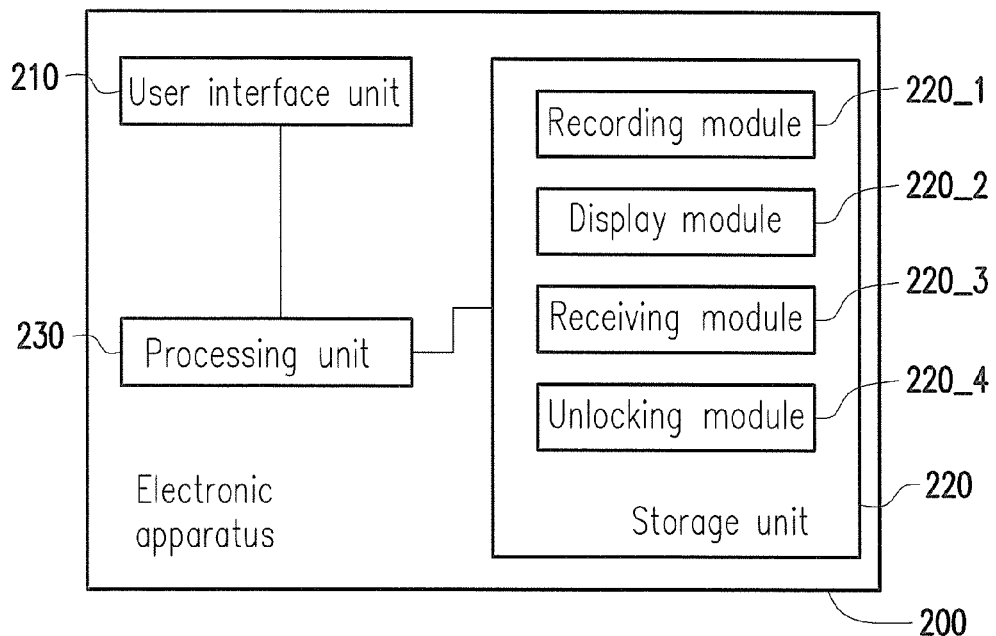
FIG. 2 is a schematic diagram of an electronic apparatus according to an embodiment of the invention.

FIG. 2 is a schematic diagram of an electronic apparatus according to an embodiment of the invention. In the present embodiment, the electronic apparatus 200 includes a user interface unit 210, a storage unit 220 and a processing unit 230. The electronic apparatus 200 is, for example, a smart phone, a tablet personal computer (PC), a personal digital assistant (PDA), a notebook PC or other similar devices. The user interface unit 210 is, for example, a touch panel, a touch screen or other elements capable of displaying information or provided to the user for inputting information. The storage unit 220 is, for example, a memory, a hard disk or any other element capable of storing data, which is used for storing a plurality of modules.

The processing unit 230 is coupled to the user interface unit 210 and the storage unit 220. The processing unit 230 is a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA), any other types of integrated circuit, state machine, advanced RISC machine (ARM)-based processor and similar devices.

In the present embodiment, the processing unit 230 can access a recording module 220_1, a display module 220_2, a receiving module 230_2 and an unlocking module 220_4 stored in the storage unit 220 to execute various steps of a dynamic unlocking method of the invention.

Figure 3:
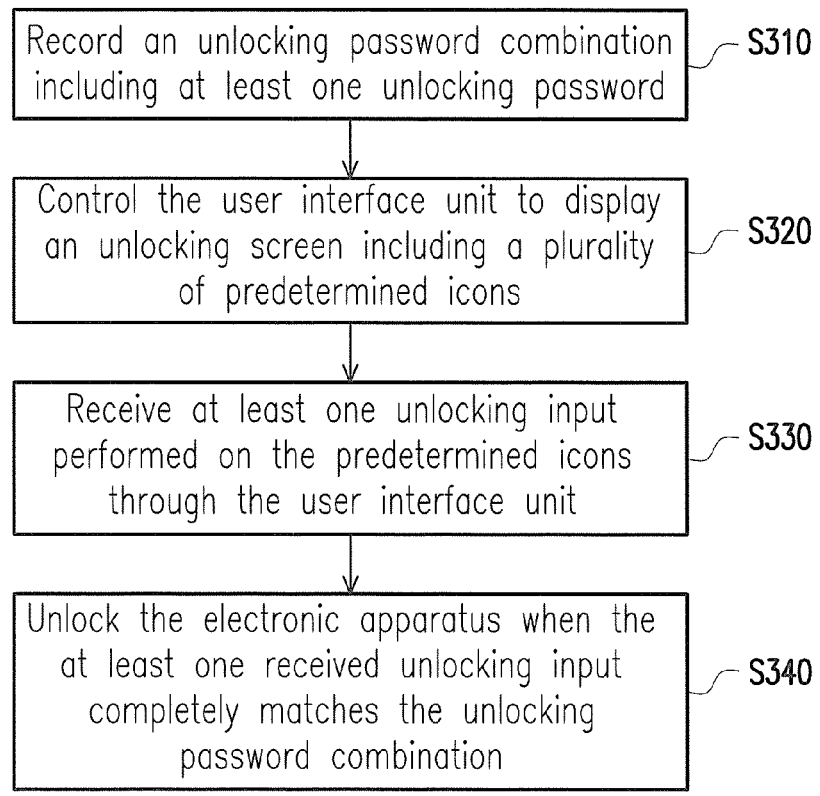
FIG. 3 is a flowchart illustrating a dynamic unlocking method according to an embodiment of the invention.

FIG. 3 is a flowchart illustrating a dynamic unlocking method according to an embodiment of the invention. The dynamic unlocking method of the present embodiment can be executed by the electronic apparatus 200 of FIG. 2, and detailed steps of the dynamic unlocking method of the invention are described below with reference of various components of FIG. 2.

In step S310, the recording module 220_1 records an unlocking password combination including at least one unlocking password. In the present embodiment, each unlocking password is characterized by a touch operation initiating from a specific icon and sliding toward a specific direction along a specific path by a specific distance. The specific direction includes a first direction or a second direction opposite to the first direction.

Then, in step S320, the display module 220_2 controls the user interface unit 210 to display an unlocking screen including a plurality of predetermined icons. The predetermined icons can be randomly arranged on the specific path, and each of the predetermined icons can be at least one of a digit, a symbol and a letter, which is not limited by the invention.

In an embodiment, the specific path may form a geometric figure, such as a round, a straight line, a square, an ellipse, etc., though the invention is not limited thereto. Moreover, based on the geometric figure formed by the specific path, a designer can correspondingly define the specific direction and the specific distance used for characterizing each of the unlocking passwords.

For example, it is assumed that the geometric figure formed by the specific path is a round, which represents that the predetermined icons are randomly arranged in a round. In this case, the first direction characterizing each of the unlocking passwords is defined as a clockwise direction, the second direction is defined as a counterclockwise direction, and the specific distance is characterized by a number of the predetermined icons passed through by the touch operation.

Figure 4:
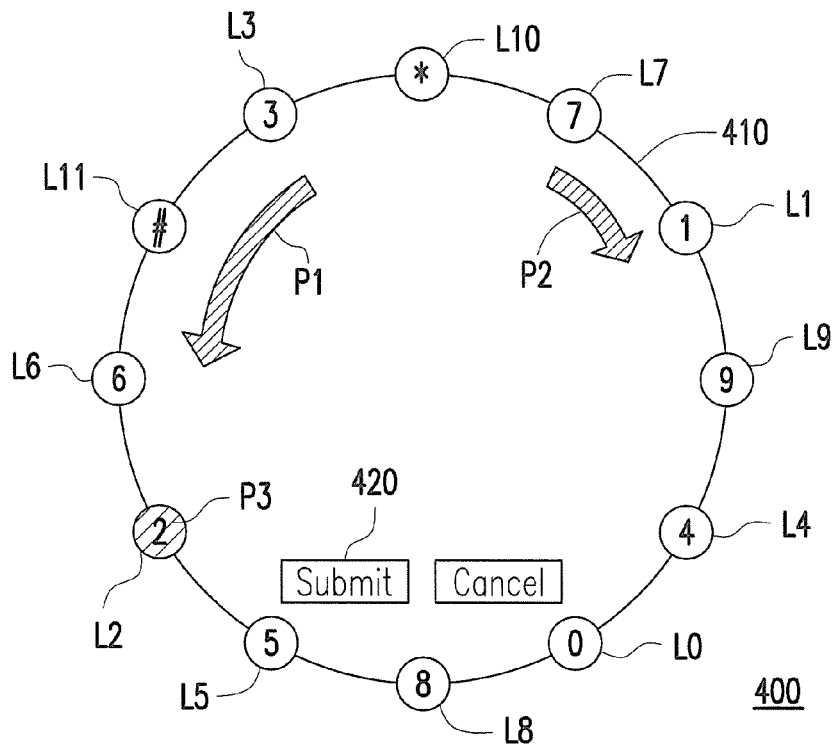
FIG. 4 is a schematic diagram of an unlocking screen according to an embodiment of the invention.

Referring to FIG. 4, FIG. 4 is a schematic diagram of an unlocking screen according to an embodiment of the invention. In the present embodiment, the unlocking screen 400 includes predetermined icons L0-L11 arranged on a round 410. The predetermined icons L0-L9 respectively correspond to digital keys 0-9, and the predetermined icons L10 and L11 respectively correspond to symbols * and #. In this case, one unlocking password can be a touch operation initiating from a certain predetermined icon and sliding toward the clockwise (or counterclockwise) direction along the round by passing through several predetermined icons. For example, an unlocking password P1 is a touch operation initiating from the predetermined icon L3 (corresponding to the digit 3) and sliding toward the counterclockwise direction along the round 410 by passing through two predetermined icons L11 and L16. For another example, an unlocking password P2 is a touch operation initiating from the predetermined icon L7 (corresponding to the digit 7) and sliding toward the clockwise direction along the round 410 by passing through one predetermined icons L1.

It should be noticed that in other embodiments, the specific distance used for characterizing the unlocking password can also be 0. Namely, such unlocking password is a touch operation only initiating from a certain predetermined icon without performing any sliding motion. Taking FIG. 4 as an example, an unlocking password P3 is a touch operation initiating from the predetermined icon L2 (corresponding to the digit 2) without performing any sliding motion.

To facilitate recording, each of the unlocking passwords of the present embodiment can be characterized in form of (a, ±b), where "a" represents the digit of the predetermined icon where the unlocking password is initiated, "+b" represents sliding towards the first direction (for example, the clockwise direction) by passing through b predetermined icons, and "−b" represents sliding towards the second direction (for example, the counterclockwise direction) by passing through b predetermined icons. Based on such recording manner, the unlocking password P1 can be recorded as (3, −2), the unlocking password P2 can be recorded as (7, 1), and the unlocking password P3 can be recorded as (2, 0).

Those skilled in the art should understand that the characterization method of each of the unlocking passwords and composition of the unlocking password combination (for example, a sequence and number of the unlocking passwords) can be set by the user in a related setting interface of the electronic apparatus 200, which is not described in detail.

Figure 1A:
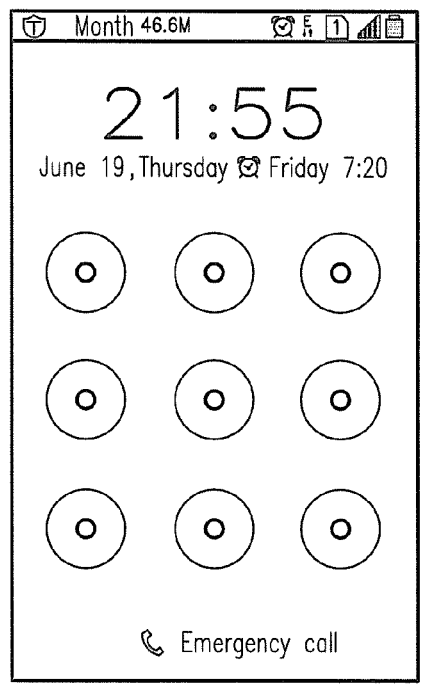
FIG. 1A and FIG. 1B respectively illustrate two commonly used unlocking methods of a smart phone.
Figure 1B:
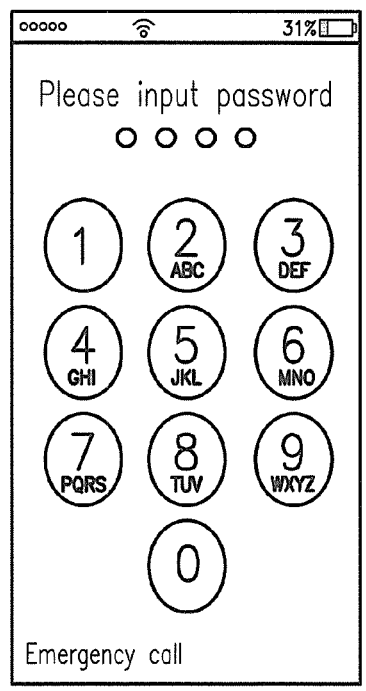

It should be noticed that since the number of the unlocking password combinations generated according to the method used for characterizing each of the unlocking passwords of the invention is far greater than the conventional unlocking methods (for example, the unlocking methods shown in FIG. 1A and FIG. 1B), a chance to find the correct unlocking password combination by repeatedly attempting is greatly decreased to a person who doesn't know the correct unlocking password combination.

Moreover, before the display module 220_2 controls the user interface unit 210 to display the unlocking screen including the geometric figure, the display module 220_2 can randomly scale a dimension of the geometric figure, and randomly adjust a display position of the geometric figure on the display screen. In this way, since the size and display position of the geometric figure are randomly configured for each time, it is hard for the person who doesn't know the correct unlocking password combination to unlock the mobile phone according to sweat stain and fingerprint remained on the user interface unit 210 (for example, the touch screen).

In other embodiments, the specific distance can be characterized by a multiple of an arc length between adjacent icons in the predetermined icons. In other words, one unlocking password can be a touch operation initiating from a certain predetermined icon and sliding toward the clockwise (or counterclockwise) direction along the round by several arc lengths.

For another example, it is assumed that the geometric figure is a straight line, which represents that the predetermined icons are randomly arranged on the straight line. In this case, the first direction characterizing each of the unlocking password is defined as a rightward direction, and the second direction is defined as a leftward direction. The specific distance is characterized by a number of the predetermined icons passed through by the touch operation. Namely, one unlocking password is characterized by a touch operation initiating from a certain predetermined icon and sliding leftward (or rightward) along the straight line by passing through several predetermined icons. It should be noticed that the unlocking password of the present embodiment can also be recorded according to the aforementioned recording method, and those skilled in the art can deduce the corresponding recording method of the present embodiment, which is not repeated.

In other embodiments, the specific distance can be characterized by a multiple of a distance between adjacent icons in the predetermined icons. In other words, one unlocking password can be a touch operation initiating from a certain predetermined icon and sliding leftward (or rightward) along the straight line by several of the aforementioned distances.

Referring to FIG. 3, in step S330, the receiving module 220_3 receives at least one unlocking input performed on the predetermined icons through the user interface unit 210. In the present embodiment, each of the unlocking inputs is, for example, a touch operation input by the user when the user is intended to unlock the electronic apparatus 200, and each of the unlocking inputs can be characterized by a touch operation initiating from a specific icon and sliding toward a specific direction along a specific path by a specific distance, for example, the aforementioned touch operation corresponding to (a, ±b).

In an embodiment, when an input time difference between two continuous unlocking inputs is greater than a predetermined threshold value, the receiving module 220_3 controls the user interface unit 210 to display an error message, and re-receives the unlocking input. The error message is, for example, a notification message notifying the user that the input time difference is too large and requiring the user to re-perform the unlocking input, though the invention is not limited thereto. Moreover, when the user interface unit 210 displays the error message, the receiving module 220_3 can record an accumulative number of times for displaying the error message. Moreover, when the accumulative number of times for displaying the error message reaches a predetermined number of times (for example, 3 times), the receiving module 220_3 can force to lock the electronic apparatus 200 by a predetermined time (for example, 30 seconds or other time intervals set by the designer). During the predetermined time, the receiving module 220_3 can ignore any unlocking input.

In an embodiment, after the user completes inputting the unlocking inputs, the user can press a button 420 (i.e., to submit the unlocking inputs) to perform a touch operation of submitting input. In other words, before the receiving module 220_3 receives the submitting input, the electronic apparatus 200 does not perform subsequent operations. In other words, since the person who doesn't know the correct unlocking password combination cannot learn the number of the unlocking passwords included in the unlocking password combination, even if the person inputs the correct unlocking password, the electronic apparatus 200 still probably cannot be unlocked due to that the person perform the touch operation of submitting input at a wrong time point. In this way, compared to the unlocking methods of FIG. 1A and FIG. 1B that have a fixed icon number or fixed password position, the method of the invention may greatly increase the unlocking difficulty.

In other embodiments, each of the predetermined icons in the unlocking screen can also be used to implement dialing an emergency telephone number (for example, 120). Taking FIG. 4 as an example, it is assumed that the user sequentially inputs the unlocking inputs of (1,0), (2,0) and (0,0) (i.e., the user respectively taps the digits 1, 2 and 0). Now, when the receiving module 220_3 determines that the received unlocking inputs match the emergency telephone number (i.e., 120), the receiving module 220_3 further determines whether a predetermined confirmation operation different to the operation of tapping the "submit" button 420/510 is performed, such as a plurality of continuous tap inputs (for example, double taps), a long press on a specific position or a specific press operation, etc. If yes, the receiving module 220_3 controls a dial application in the electronic apparatus 200 to dial the emergency telephone number (i.e., 120), and if not, the emergency telephone number is not dialed. In this way, in case that the electronic apparatus 200 is not unlocked, the user can still click the predetermined icons corresponding to the emergency telephone number, and perform the predetermined confirmation operation to trigger the emergency telephone number dialing function of the electronic apparatus 200.

Then, in step S340, when the at least one received unlocking input completely matches the unlocking password combination, the unlocking module 220_4 unlocks the electronic apparatus 200. The unlocked electronic apparatus 200 may display a screen of the electronic apparatus 200 before being locked or a homepage, etc., which is not limited by the invention.

Moreover, when the at least one received unlocking input is not matched to the unlocking password combination, the unlocking module 220_4 can also control the user interface unit 210 to display the error message, and request the receiving module 220_3 to re-receive the unlocking inputs. Now, the receiving module 220_3 can also force to lock the electronic apparatus 200 for a predetermined time when the accumulative number of times for displaying the error message reaches the predetermined number of times, and details thereof are not repeated.

It should be noticed that since each time when the unlocking screen is displayed, the predetermined icons are randomly arranged on the specific path, each time the unlocking trace remained on the electronic apparatus 200 by the user is almost different.

Figure 5:
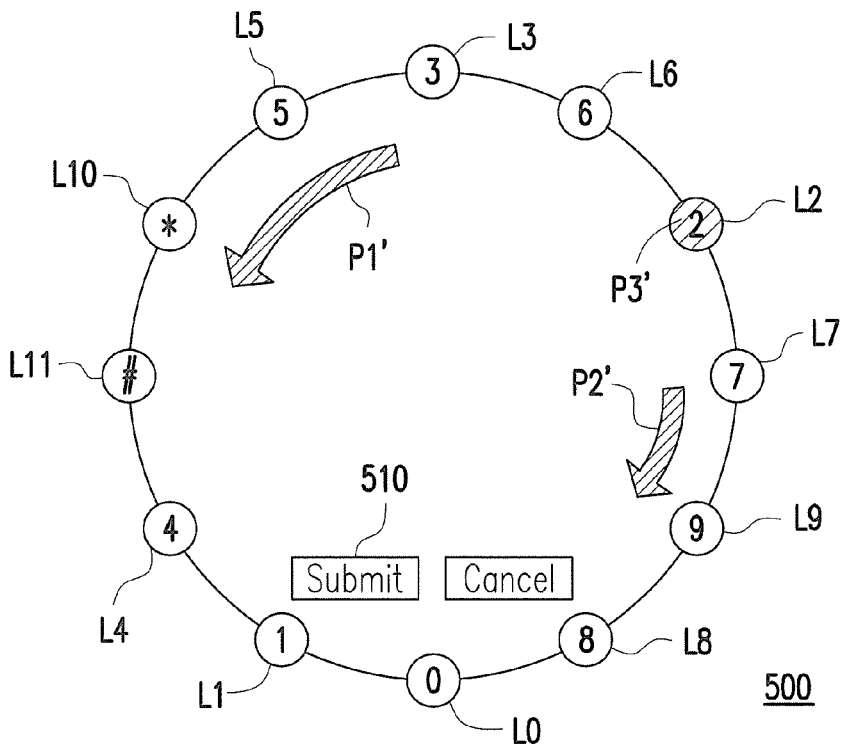
FIG. 5 is a schematic diagram of an unlocking screen according to the embodiment of FIG. 4.

Referring to FIG. 5, FIG. 5 is a schematic diagram of an unlocking screen according to the embodiment of FIG. 4. In the present embodiment, it is assumed that FIG. 4 and FIG. 5 are unlocking screens respectively displayed at different time points, and the unlocking password combination set by the user is the aforementioned unlocking passwords P1-P3 (i.e., (3,−2), (7,1) and (2,0). If the unlocking screen 500 shown in FIG. 5 is to be successfully unlocked, the user is required to input the unlocking inputs corresponding to the unlocking passwords P1-P3 in FIG. 5.

In detail, the user first touches the predetermined icon L3 corresponding to the digit 3 in the unlocking screen 500, and slides toward the counterclockwise direction by two predetermined icons to complete an unlocking input P1' (i.e., (3,−2)). Then, the user touches the predetermined icon L7 corresponding to the digit 7 in the unlocking screen 500, and slides toward the clockwise direction by one predetermined icons to complete an unlocking input P2' (i.e., (7,1)). Thereafter, the user clicks the predetermined icon L2 corresponding to the digit 2 in the unlocking screen 500 to complete an unlocking input P3'. After completing the unlocking inputs P1'-P3', the user can click the submit button 510 to submit the unlocking inputs P1'-P3'. In this way, the unlocking module 220_4 determines that the unlocking inputs P1'-P3' completely match the unlocking passwords P1-P3 in the unlocking password combination, and unlocks the electronic apparatus 200.

In summary, after the characterization method of the unlocking password is complicated, the dynamic unlocking method provided by the invention can effectively increase difficulty for unlocking the electronic apparatus. Moreover, since the predetermined icons on the unlocking screen are randomly arranged each time when the unlocking screen is displayed, a person who doesn't know the unlocking password is unable to easily get the correct unlocking password combination from an unlocking trace remained on the electronic apparatus. In other words, the data stored in the electronic apparatus cannot be easily obtained by others, so that the risk and economic loss caused by loss of the electronic apparatus can be greatly reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A dynamic unlocking method, adapted to an electronic apparatus, comprising:
   recording an unlocking password combination comprising at least one unlocking password, wherein each of the unlocking passwords is characterized by a touch operation initiating from a specific icon and sliding toward a specific direction along a specific path by a specific distance, wherein the specific direction comprises a first direction or a second direction opposite to the first direction, wherein the each of the unlocking passwords is expressed as a form of (a, ±b), "a" represents the specific icon, "b" represents the specific distance, "+b" represents sliding towards the first direction along the specific path by passing through b from the specific icon, and "−b" represents sliding towards the second direction along the specific path by passing through b from the specific icon;
   displaying an unlocking screen comprising a plurality of predetermined icons, wherein the predetermined icons are randomly arranged on the specific path;
   receiving at least one unlocking input performed on the predetermined icons; and
   unlocking the electronic apparatus in response to the at least one received unlocking input completely matches the unlocking password combination.

2. The dynamic unlocking method as claimed in claim 1, wherein the specific distance of a part of the unlocking passwords in the at least one unlocking password is 0.

3. The dynamic unlocking method as claimed in claim 1, wherein the specific distance is characterized by a number of the predetermined icons passed through by the touch operation.

4. The dynamic unlocking method as claimed in claim 1, wherein the specific path forms a geometric figure, and before the step of displaying the unlocking screen comprising a plurality of the predetermined icons, the dynamic unlocking method further comprises:
   randomly scaling a dimension of the geometric figure.

5. The dynamic unlocking method as claimed in claim 4, wherein the geometric figure is a round, the first direction is a clockwise direction, and the second direction is an counterclockwise direction,
   wherein the specific distance is characterized by a multiple of an arc length between adjacent icons in the predetermined icons.

6. The dynamic unlocking method as claimed in claim 4, wherein the geometric figure is a straight line, the first direction is a rightward direction, and the second direction is a leftward direction,
   wherein the specific distance is characterized by a multiple of a distance between adjacent icons in the predetermined icons.

7. The dynamic unlocking method as claimed in claim 1, wherein the specific path forms a geometric figure, and before the step of displaying the unlocking screen comprising a plurality of the predetermined icons, the dynamic unlocking method further comprises:

randomly adjusting a display position of the geometric figure.

8. The dynamic unlocking method as claimed in claim 1, wherein in response to the at least one received unlocking input is not completely matched to the unlocking password combination, displaying an error message, and re-receiving the at least one unlocking input.

9. The dynamic unlocking method as claimed in claim 8, wherein the step of receiving the at least one unlocking input comprises:

displaying the error message and re-receiving the at least one unlocking input in response to an input time difference between two continuous unlocking inputs in the at least one unlocking input is greater than a predetermined threshold value, wherein in response to an accumulative number of times for displaying the error message reaches a predetermined number of times, the electronic apparatus is forced to be locked for a predetermined time.

10. The dynamic unlocking method as claimed in claim 1, wherein each of the predetermined icons comprises at least one of a digit, a symbol and a letter.

11. The dynamic unlocking method as claimed in claim 1, wherein the step of receiving the at least one unlocking input performed on the predetermined icons comprises:

determining whether a predetermined confirmation operation is received in response to the at least one received unlocking input matches an emergency telephone number; and if yes, dialing the emergency telephone number.

12. An electronic apparatus, comprising:
a user interface unit;
a storage unit, storing a plurality of modules; and
a processing unit, coupled to the user interface unit and the storage unit, and accessing and executing the modules stored in the storage unit, wherein the modules comprises:

a recording module, recording an unlocking password combination comprising at least one unlocking password, wherein each of the unlocking passwords is characterized by a touch operation initiating from a specific icon and sliding toward a specific direction along a specific path by a specific distance, and the specific direction comprises a first direction or a second direction opposite to the first direction, wherein the each of the unlocking passwords is expressed as a form of (a, ±b), "a" represents the specific icon, "b" represents the specific distance, "+b" represents sliding towards the first direction along the specific path by passing through b from the specific icon, and "−b" represents sliding towards the second direction along the specific path passing through b from the specific icon;

a display module, controlling the user interface unit to display an unlocking screen comprising a plurality of predetermined icons, wherein the predetermined icons are randomly arranged on the specific path;

a receiving module, receiving at least one unlocking input performed on the predetermined icons through the user interface unit; and an unlocking module, unlocking the electronic apparatus in response to the at least one received unlocking input completely matches the unlocking password combination.

13. The electronic apparatus as claimed in claim 12, wherein the specific distance of a part of the unlocking passwords in the at least one unlocking password is 0.

14. The electronic apparatus as claimed in claim 12, wherein the specific distance is characterized by a number of the predetermined icons passed through by the touch operation.

15. The electronic apparatus as claimed in claim 12, wherein the specific path forms a geometric figure, and the display module further randomly scales a dimension of the geometric figure.

16. The electronic apparatus as claimed in claim 15, wherein the geometric figure is a round, the first direction is a clockwise direction, and the second direction is an counterclockwise direction, wherein the specific distance is characterized by a multiple of an arc length between adjacent icons in the predetermined icons.

17. The electronic apparatus as claimed in claim 15, wherein the geometric figure is a straight line, the first direction is a rightward direction, and the second direction is a leftward direction, wherein the specific distance is characterized by a multiple of a distance between adjacent icons in the predetermined icons.

18. The electronic apparatus as claimed in claim 12, wherein the specific path forms a geometric figure, and the display module further randomly adjusts a display position of the geometric figure.

19. The electronic apparatus as claimed in claim 12, wherein in response to the at least one received unlocking input is not completely matched to the unlocking password combination, the unlocking module controls the user interface unit to display an error message, and requests the receiving module to re-receive the at least one unlocking input.

20. The electronic apparatus as claimed in claim 19, wherein in response to an input time difference between two continuous unlocking inputs in the at least one unlocking input is greater than a predetermined threshold value, the receiving module controls the user interface unit to display the error message and re-receive the at least one unlocking input, wherein in response to an accumulative number of times for displaying the error message reaches a predetermined number of times, the receiving module forces to lock the electronic apparatus for a predetermined time.

21. The electronic apparatus as claimed in claim 12, wherein each of the predetermined icons comprises at least one of a digit, a symbol and a letter.

22. The electronic apparatus as claimed in claim 12, wherein in response to the at least one received unlocking input matches an emergency telephone number, the receiving module determines whether a predetermined confirmation operation is received, and dials the emergency telephone number if yes.

* * * * *